(12) United States Patent
Lu et al.

(10) Patent No.: US 11,397,662 B2
(45) Date of Patent: Jul. 26, 2022

(54) METHOD FOR DEBUGGING COMPUTER PROGRAM, DEVICE EMPLOYING METHOD, AND STORAGE MEDIUM

(71) Applicant: HON HAI PRECISION INDUSTRY CO., LTD., New Taipei (TW)

(72) Inventors: Chun-Ming Lu, New Taipei (TW); Chien-Fa Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/404,563

(22) Filed: Aug. 17, 2021

(65) Prior Publication Data

US 2022/0058109 A1    Feb. 24, 2022

(30) Foreign Application Priority Data

Aug. 19, 2020    (CN) .......................... 202010839155.X

(51) Int. Cl.
  *G06F 9/44*      (2018.01)
  *G06F 11/36*     (2006.01)
  *G06F 11/30*     (2006.01)
  *G06F 11/32*     (2006.01)

(52) U.S. Cl.
  CPC ...... *G06F 11/3636* (2013.01); *G06F 11/3068* (2013.01); *G06F 11/322* (2013.01); *G06F 11/366* (2013.01)

(58) Field of Classification Search
  None
  See application file for complete search history.

(56) References Cited

U.S. PATENT DOCUMENTS

| | | | |
|---|---|---|---|
| 6,658,650 B1 * | 12/2003 | Bates | G06F 11/362 717/129 |
| 9,916,407 B2 * | 3/2018 | Drasny | G06F 30/30 |
| 10,311,184 B2 * | 6/2019 | Liu | G06F 16/2455 |
| 2012/0167056 A1 * | 6/2012 | Brunswig | G06F 11/362 717/129 |
| 2015/0169819 A1 * | 6/2015 | Hsu | G06F 30/398 716/113 |

* cited by examiner

*Primary Examiner* — Qamrun Nahar
(74) *Attorney, Agent, or Firm* — ScienBiziP, P.C.

(57) ABSTRACT

A method for debugging a program, based on simulating an object program and comparing simulated waveforms with standard waveforms are applied in an electronic device. A simulated environment corresponding to the object program is established and multiple instructions from code of the object program are mapped against the standard waveforms. Trigger points are set in the object program, the object program is run from the trigger point and simulation waveforms are stored. The simulation waveforms are compared with the standard waveforms, and the location of a bug of the object program is found according a comparison. The bug may be resolved or cured. The electronic device utilizing the method is also disclosed.

17 Claims, 3 Drawing Sheets

METHOD FOR DEBUGGING COMPUTER PROGRAM, DEVICE EMPLOYING METHOD, AND STORAGE MEDIUM

FIELD

The subject matter herein generally relates to program debugging.

BACKGROUND

When a bug appears in a system application, the bug usually arises during program verification of a field-programmable gate array (FPGA). When the system application is simulated, the bug is harder to find and, on the basis of a simulation, are easily ignored.

Thus, there is room for improvement.

BRIEF DESCRIPTION OF THE DRAWINGS

Implementations of the present disclosure will now be described, by way of embodiments, with reference to the attached figures.

DETAILED DESCRIPTION

Figure 1:
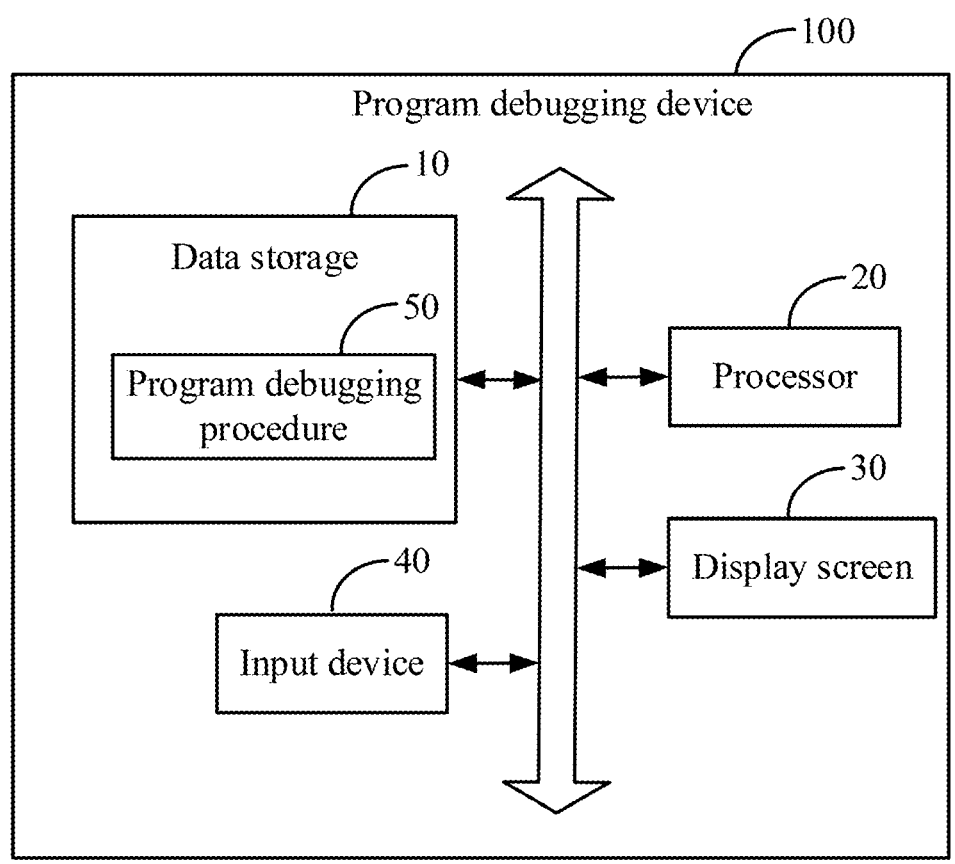
FIG. 1 is a block diagram of an embodiment of a program debugging device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

The term "comprising," when utilized, means "including, but not necessarily limited to"; it specifically indicates open-ended inclusion or membership in the so-described combination, group, series, and the like.

FIG. 1 illustrates an embodiment of a program debugging device 100. The program debugging device 100 can comprise at least one data storage 10, at least one processor 20, a display screen 30, an input device 40, and a program debugging procedure 50. The program debugging procedure 50 reflects a plurality of computerized codes, the plurality of computerized codes may include commands that can be executed by the processor 20.

In one embodiment, the program debugging device 100 can be a computer, a server, or the like. The program debugging device 100 can further comprise a network access device, and communication buses.

In one embodiment, the data storage 10 can be in the program debugging device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the program debugging device 100.

In one embodiment, the display screen 30 is configured to display various data during program debugging. For example, the display screen 30 displays simulation waveforms and standard waveforms of program instructions. The input device 40 may comprise a mouse and a keyboard. The input device 40 is configured to receive data or instructions input by a debugger.

Figure 2:
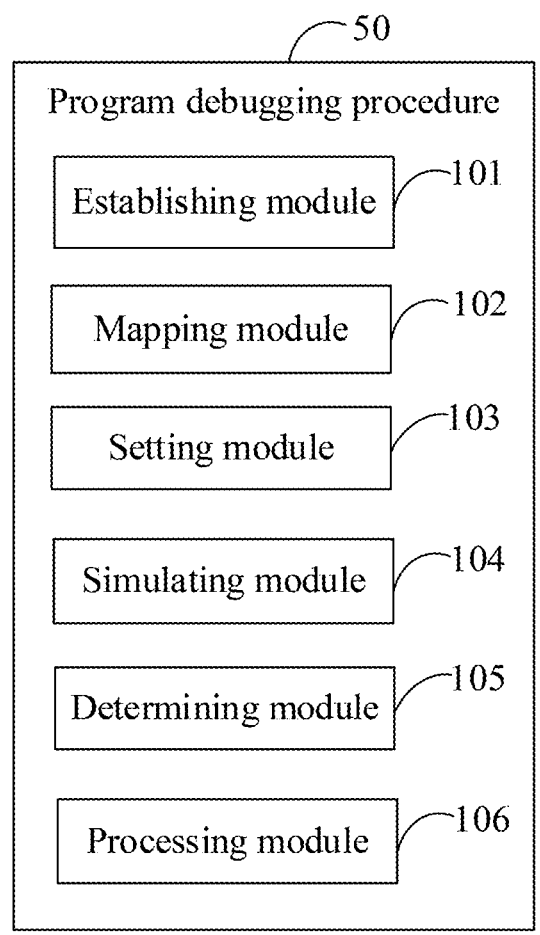
FIG. 2 is a block diagram of an embodiment of a program debugging procedure applied in the device of FIG. 1.

FIG. 2 illustrates the program debugging procedure 50. The program debugging procedure 50 comprises a plurality of modules, such as an establishing module 101, a mapping module 102, a setting module 103, a simulating module 104, a determining module 105, and a processing module 106. The modules 101-106 may comprise one or more software programs in the form of computerized codes stored in the data storage 10. The computerized codes may include commands that can be executed by the processor 20 to provide functions for the modules 101-106.

The establishing module 101 establishes a simulated environment corresponding to an object program.

In one embodiment, the object program can be selected according to an actual requirement. A format of the object program can comprise a binary format or a hex format.

The mapping module 102 maps multiple instructions of the object program with standard waveforms corresponding to the multiple instructions.

In one embodiment, the object program can comprise multiple instructions, the standard waveforms can be waveforms generated by executing the multiple instruction when there is no bug in the instruction code. The mapping module 102 can build a mapping relationship between the multiple instructions and the standard waveforms.

The setting module 103 sets one or more trigger points in the object program.

In one embodiment, setting trigger points renders it more convenient to locate a bugged instruction. The trigger point can comprise a general purpose input output (GPIO) signal.

The simulating module 104 runs the object program from the trigger point and stores simulation waveforms of the object program.

When the object program is simulated, the simulation waveforms of the object program can be obtained.

The determining module 105 compares the simulation waveforms with the standard waveforms.

In one embodiment, the determining module 105 can compare the simulation waveforms with the standard waveforms and determine whether a bug exists in the object program according to a comparison.

In one embodiment, the simulation waveforms and the standard waveforms can be displayed in the display screen 30 for a debugger and/or user to view.

The processing module 106 finds the bug of the object program and can fix the bug when the simulation waveforms are inconsistent with the standard waveforms.

In one embodiment, when the determining module 105 determines that an difference exists between the simulation waveforms and the standard waveforms, the processing module 106 can find the bug and fix the bug. For example, the processing module 106 can analyze abnormal waveform segment existing in the simulation waveforms to find the bug of the object program.

In one embodiment, the processing module 106 can further analyze the simulation waveforms to find a bottleneck of the object program, enabling the output of an optimizing suggestion.

Figure 3:
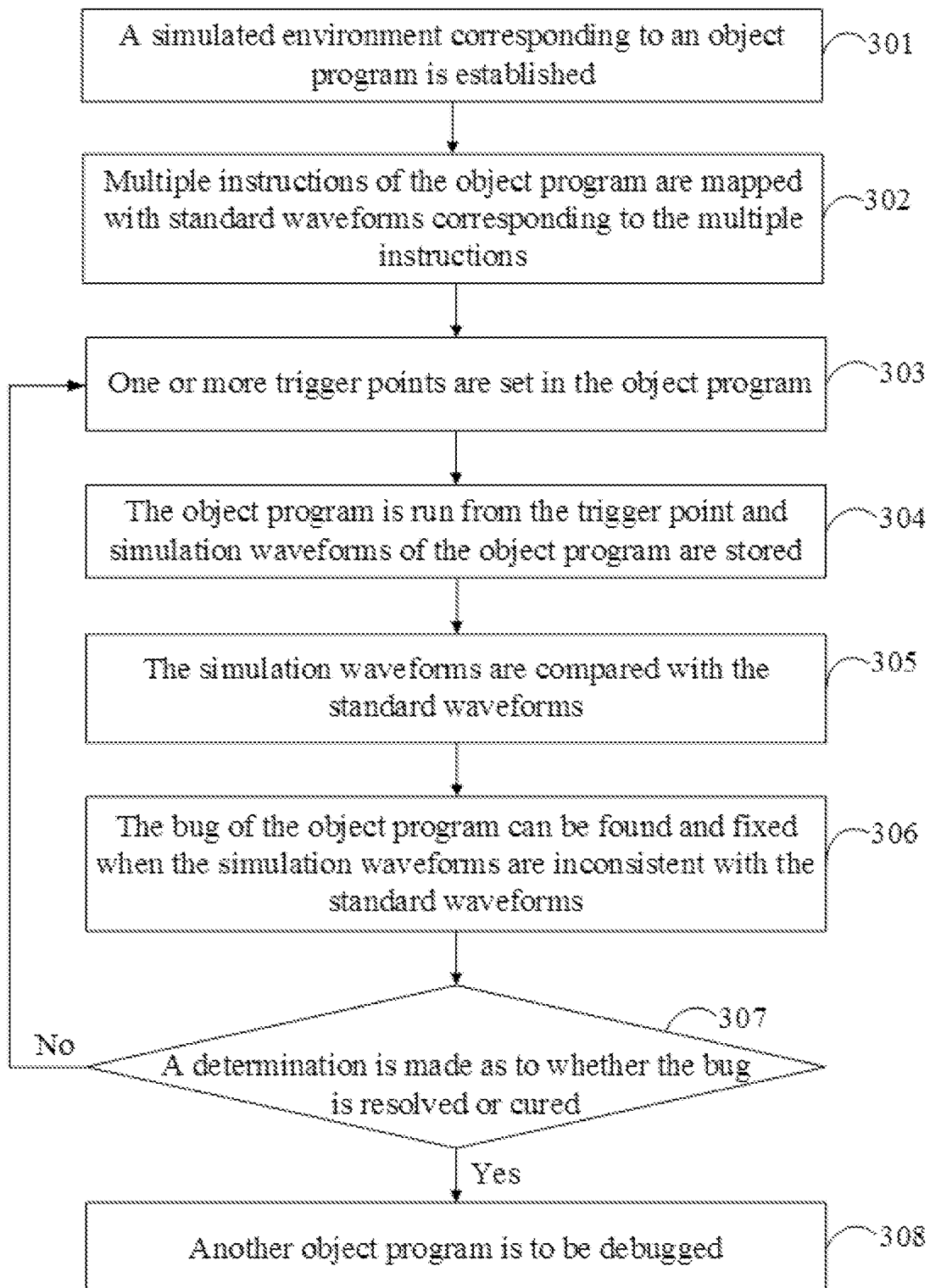
FIG. 3 is a flow diagram of an embodiment of a program debugging method applied in the device of FIG. 1.

FIG. 3 illustrates one exemplary embodiment of a program debugging method. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 301, a simulated environment corresponding to an object program is established.

In one embodiment, the object program can be selected according to an actual requirement. A format of the object program can comprise a binary format or a hex format.

In one embodiment, the block which establishes the simulated environment corresponding to the object program can comprise: reading a program file corresponding to the object program and running the program file to simulate an execution process of the object program.

In block 302, multiple instructions of the object program are mapped with standard waveforms corresponding to the multiple instructions.

In one embodiment, the object program can comprise multiple instructions, the standard waveforms can be waveforms generated by executing the multiple instruction when there is no bug in the instruction code. A mapping relationship is thereby built between the multiple instructions and the standard waveforms.

In one embodiment, the block of mapping the multiple instructions of the object program with the standard waveforms can comprise: obtaining a list file of a machine code compiler and the multiple instructions of the object program and mapping the multiple instructions with the standard waveforms according to the list file of the machine code compiler.

In one embodiment, the list file of the machine code compiler can be prestored in the data storage 10.

In block 303, one or more trigger points are set in the object program.

In one embodiment, setting trigger points renders it more convenient to locate a bugged instruction. The trigger point can comprise a general purpose input output (GPIO) signal.

In one embodiment, the block of setting the trigger point in the object program can comprise: performing a simulation of the object program being executed and finding one or more object instructions containing the bug according to the simulated execution, and setting the one or more trigger points to occur before the object instruction is executed.

In one embodiment, the block of setting the trigger point in the object program can further comprise setting the trigger points in a quarter, a middle, and a three-quarter position of the object program.

In block 304, the object program is run from the trigger point and simulation waveforms of the object program are stored.

When the object program is simulated, the simulation waveforms of the object program can be obtained. The simulation waveforms of the object program can be stored in the data storage 10.

In block 305, the simulation waveforms are compared with the standard waveforms.

In one embodiment, the simulation waveforms can be compared with the standard waveforms to determine the existence of a bug according to a comparison.

In one embodiment, the simulation waveforms and the standard waveforms can be displayed in the display screen 30 for a debugger and/or a user to view.

In block 306, the bug of the object program can be found and fixed when the simulation waveforms are inconsistent with the standard waveforms.

In one embodiment, when a difference exists between the simulation waveforms and the standard waveforms, the bug can be found and fixed. For example, abnormal waveform segments existing in the simulation waveforms can be analyzed to find the bug of the object program.

In block 307, a determination is made as to whether the bug is resolved or cured.

In on embodiment, the bug is determined to be fixed or not by the debugger. If the bug is not fixed, return to the block 303, and repeat the block 303 to 306 until the bug is fixed. If the bug is fixed, end the current process. For example, block 308 brings another object program to be debugged.

In one embodiment, the program debugging method can simulate the object program from the trigger point and store the simulation waveforms, which can reduce repetition in a debugging process and debugging time, and further reduce a memory space of a hard disk for storing the simulation waveforms.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A program debugging method comprising:
    establishing a simulated environment corresponding to an object program;
    mapping multiple instructions of the object program with standard waveforms corresponding to the multiple instructions;
    setting a trigger point in the object program;
    running the object program from the trigger point and storing simulation waveforms of the object program;
    comparing the simulation waveforms with the standard waveforms; and finding a bug of the object program and fixing the bug when the simulation waveforms are inconsistent with the standard waveforms.

2. The program debugging method of claim 1, wherein establishing the simulated environment corresponding to the object program comprises:
   reading a program file corresponding to the object program; and
   running the program file to simulate an execution process of the object program.

3. The program debugging method of claim 2, wherein setting the trigger point in the object program comprises:
   performing a simulation of the object program and finding an object instruction containing the bug according to a simulation result of the object program; and
   setting the trigger point before the object instruction is executed.

4. The program debugging method of claim 2, wherein a format of the program file comprises a binary format or a hex format.

5. The program debugging method of claim 1, wherein setting the trigger point in the object program comprises:
   setting the trigger point in a middle position of the object program.

6. The program debugging method of claim 1, further comprising:
   determining whether the bug is resolved; and
   resetting the trigger point in the object program until the bug is resolved.

7. The program debugging method of claim 1, wherein mapping the multiple instructions of the object program with the standard waveforms corresponding to the multiple instructions comprises:
   obtaining a list file of a machine code compiler and the multiple instructions of the object program;
   mapping the multiple instructions with the standard waveforms according to the list file of the machine code compiler.

8. The program debugging method of claim 1, wherein the trigger point comprises a general purpose input output (GPIO) signal.

9. A program debugging device comprising:
   at least one processor; and
   a data storage storing one or more programs which when executed by the at least one processor, cause the at least one processor to:
      establish a simulated environment corresponding to an object program;
      map multiple instructions of the object program with standard waveforms corresponding to the multiple instructions;
      set a trigger point in the object program;
      run the object program from the trigger point and store simulation waveforms of the object program;
      compare the simulation waveforms with the standard waveforms; and
      find a bug of the object program and fix the bug when the simulation waveforms are inconsistent with the standard waveforms.

10. The program debugging device of claim 9, wherein the at least one processor establishing the simulated environment corresponding to the object program comprises:
   reading a program file corresponding to the object program; and
   running the program file to simulate an execution process of the object program.

11. The program debugging device of claim 10, wherein the at least one processor setting the trigger point in the object program comprises:
   performing a simulation of the object program and finding an object instruction containing the bug according to a simulation result of the object program; and
   setting the trigger point before the object instruction is executed.

12. The program debugging device of claim 10, wherein a format of the program file comprises a binary format or a hex format.

13. The program debugging device of claim 9, wherein the at least one processor setting the trigger point in the object program comprises:
   setting the trigger point in a middle position of the object program.

14. The program debugging device of claim 9, wherein the at least one processor is further configured to:
   determine whether the bug is resolved; and
   reset the trigger point in the object program until the bug is resolved.

15. The program debugging device of claim 9, wherein the at least one processor mapping the multiple instructions of the object program with the standard waveforms corresponding to the multiple instructions comprises:
   obtaining a list file of a machine code compiler and the multiple instructions of the object program;
   mapping the multiple instructions with the standard waveforms according to the list file of the machine code compiler.

16. The program debugging device of claim 9, wherein the trigger point comprises a general purpose input output (GPIO) signal.

17. A non-transitory storage medium having stored thereon instructions that, when executed by a processor of an electronic device, cause the electronic device to perform a program debugging method, the program debugging method comprising:
   establishing a simulated environment corresponding to an object program;
   mapping multiple instructions of the object program with standard waveforms corresponding to the multiple instructions;
   setting a trigger point in the object program;
   running the object program from the trigger point and storing simulation waveforms of the object program;
   comparing the simulation waveforms with the standard waveforms; and
   finding a bug of the object program and fixing the bug when the simulation waveforms are inconsistent with the standard waveforms.

* * * * *